(12) United States Patent
Hiller

(10) Patent No.: US 9,010,678 B1
(45) Date of Patent: Apr. 21, 2015

(54) RAPID DEPLOYMENT AIR AND WATER VEHICLE

(71) Applicant: The Boeing Company, Chicago, IL (US)

(72) Inventor: Nathan Hiller, Irvine, CA (US)

(73) Assignee: The Boeing Company, Chicago, IL (US)

(*) Notice: Subject to any disclaimer, the term of this patent is extended or adjusted under 35 U.S.C. 154(b) by 144 days.

(21) Appl. No.: 13/786,299

(22) Filed: Mar. 5, 2013

(51) Int. Cl.
*B60F 5/02* (2006.01)

(52) U.S. Cl.
CPC ............................. *B60F 5/02* (2013.01)

(58) Field of Classification Search
CPC  B64C 35/005; B64C 37/00; B64C 2201/126; B60F 5/02
USPC ................. 244/2, 13, 50, 101, 105, 137.1
See application file for complete search history.

(56) References Cited

U.S. PATENT DOCUMENTS

| 2,444,332 | A  | * | 6/1948 | Briggs et al. ................... 244/49 |
| 7,156,033 | B2 | * | 1/2007 | Mears et al. ................... 114/68 |
| 2008/0035786 | A1 | * | 2/2008 | Bilyk et al. ................... 244/13 |
| 2010/0200689 | A1 | * | 8/2010 | Grip ................................ 244/2 |
| 2011/0155840 | A1 | * | 6/2011 | Lind et al. ................... 244/13 |
| 2011/0226174 | A1 |   | 9/2011 | Parks |
| 2012/0138727 | A1 | * | 6/2012 | Fisher ........................ 244/3.15 |

OTHER PUBLICATIONS

The Navy Unmanned Undersea Vehicle Master Plan, 2004, http://www.navy.mil/navydata/technology/uuvmp.pdf.
Hiller, N., Non Published Patent Application Entitled "Undersea Energy Harvesting Electrical Power Station", Filed in 2011.
Hiller, N., Non Published Patent Application Entitled "Wave Energy-Based Communication", Filed in 2011.

* cited by examiner

*Primary Examiner* — Tien Dinh
*Assistant Examiner* — Christopher Hutchens
(74) *Attorney, Agent, or Firm* — Klintworth & Rozenblat IP LLC

(57) ABSTRACT

A vehicle which is adaptable for both flight and water travel includes: a body; a wing, a stabilizer, or a first propelling member; and at least one attachment member. The body is configured to fly through air and to move through water. The at least one attachment member attaches the wing, the stabilizer, or the first propelling member to the body while the body is in flight. The at least one attachment member detaches at least a portion of the wing, at least a portion of the stabilizer, or at least a portion of the first propelling member from the body when the body is in the water.

19 Claims, 2 Drawing Sheets

RAPID DEPLOYMENT AIR AND WATER VEHICLE

FIELD OF THE DISCLOSURE

This disclosure relates to a vehicle which is adaptable for both flight and water travel.

BACKGROUND

Vehicles, such as unmanned vehicles or unmanned utility vehicle (UUV) or other types of vehicles, are often used to perform functions or missions that are too dangerous or expensive for manned vehicles. Such vehicles may be rapidly deployed using aircraft, but relocating these aircraft to the area of interest is expensive. Still other conventional submersible vessel and unmanned aerial vehicles, such as the one disclosed in US patent application publication no. US 2011/0226174, which is herein incorporated by reference in its entirety, discloses a "flying submarine 100" that includes features of underwater buoyancy, gliding, and/or conventional propeller driven propulsion, re-deployable wings for multi-mode operation; chord-wise wing fold which doubles a control surface, hydro-spike for water entry; means of re-launching from the water; modular nose payload and other features.

Furthermore, requirements for missions and minimizing costs includes identifying commonality among one or more UUV functions are significant considerations for any IAN program. For example, commonality may involve external interfaces, such as one or more platform interfaces, including handling equipment, communications links, as well as sharing vehicle components, one or more pieces of equipment, and other assets including one or more cargo or cabin features. Additionally, many unmanned vehicles are built for nominal performance in one mission requirement such as Man-portable, light weight vehicle, heavy weight vehicle, and large class but may be significantly limited when it comes to other mission requirements not specifically designed for.

A vehicle, such as an unmanned vehicle or other type of vehicle, is needed to overcome one or more of the issues, for example, modularity and multi-function capability of one or more of the existing vehicles or methods of their deployment.

SUMMARY

In one embodiment, a vehicle is disclosed that includes one or more separable systems which are adaptable for both flight and water travel. Furthermore, the vehicle disclosed includes apparatus and methods whereby the separable systems have different configurations in a first mode of vehicle travel, e.g., an initial state, pre-impact state, which may include detachment apparatus such as explosive bolts or salt water soluble glue to maintain component attachment, as compared to a second mode of travel, e.g., modified state, precursor to post-impact state, or post-impact state, in which the configuration is changed through detachment through one or more detachment apparatuses.

Advantageously, the modified state may reuse equipment of the initial state but also now have a different configuration that provides one or more benefits over the configuration used in the initial state. In one aspect, the one or more separable systems of the vehicle includes: a body; a wing, a stabilizer, or a first propelling member; and at least one attachment member. In one variant, the body is configured to fly through air and to move through water. The at least one attachment member attaches the wing, the stabilizer, or the first propelling member to the body while the body is in flight. The least one attachment member detaches at least a portion of the wing, at least a portion of the stabilizer, or at least a portion of the first propelling member from the body when the body is in the water.

In one variation of the above embodiment, another vehicle is disclosed which is adaptable for both flight and water travel. The vehicle includes: a body; a wring or a stabilizer; a first propelling member; a second propelling member; and a motor. The body is configured to fly through air and to move through water. The wing or stabilize is coupled to the body while in flight. The first propelling member is for propelling the body in flight. The second propelling member is for propelling the body through the water. The motor is for driving the first propelling member while the body is in flight, and for driving the second propelling member while the body is in the water. At least a portion of the wing, at least a portion of the stabilizer, or at least a portion of the first propelling member is configured to separate from the body when the body is in the water.

In still another variation of the above embodiments, a method of deploying a vehicle is disclosed. In one step, the vehicle is flown while a wing, a stabilizer, or a first propelling member is attached to the vehicle. In an additional step, the vehicle enters water. In yet another step, at least a portion of the wing, at least a portion of the stabilizer, or at least a portion of the first propelling member is separated from the vehicle when the vehicle is in the water. In an additional step, the vehicle is powered to move through the water.

The scope of the present disclosure is defined solely by the appended claims and is not affected by the statements within this summary.

BRIEF DESCRIPTION OF THE DRAWINGS

The disclosure can be better understood with reference to the following drawings and description. The components in the figures are not necessarily to scale, emphasis instead being placed upon illustrating the principles of the disclosure.

DETAILED DESCRIPTION

Figure 1:
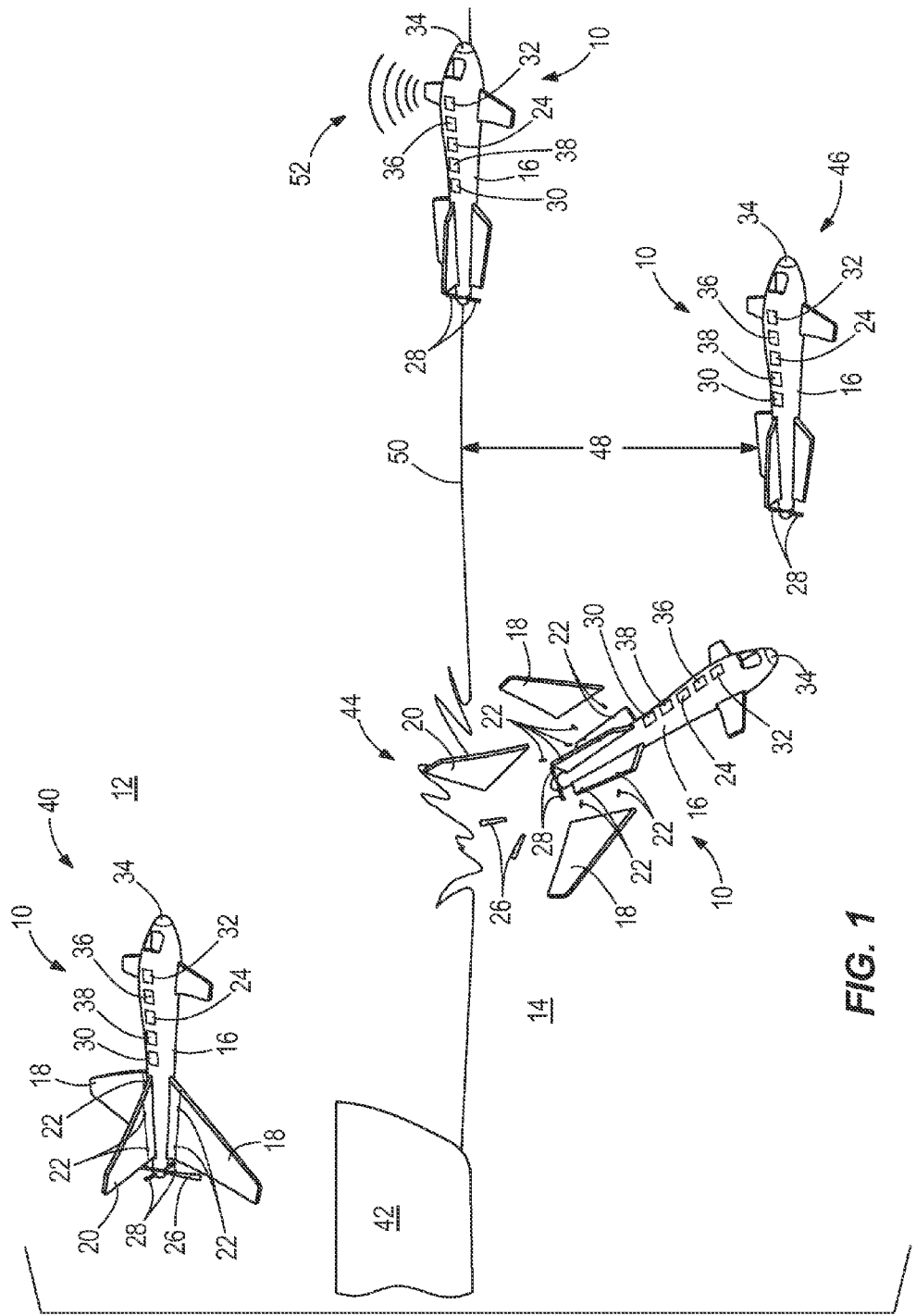
FIG. 1 illustrates a perspective view of one embodiment of a vehicle which is adapted to both in air and to move through water.

FIG. 1 illustrates a perspective view of one embodiment of a vehicle 10 which is adapted to both in air 12 and to move through water 14. The water 14 may comprise sea-water or another type of water. The vehicle 10 is a rapid-deployment, unmanned, underwater-adapted, and flight-adapted vehicle. The vehicle 10 includes a body 16, wings 18, a stabilizer 20, attachment members 22, submersion-controlling device 24, a first propelling member 26, a second propelling member 28, a motor 30, a navigation system 32, a control system 34, and a communication system 36. The vehicle 10 may be configured to carry a payload 38. In other embodiments, the vehicle 10 may contain varying numbers (including zero) or types of the above components, one or more additional components, or may be adapted for one or more different functions.

The body 16 is configured to fly through air 12 and to move through and under water 14. When the body 16 is flying through the air 12, e.g., an initial state or a pre-impact state, the wings 18, stabilizer 20, and first propelling member 26 are attached to the body 16 with the attachment members 22. The attachment members 22 may comprise explosive bolts, water soluble glue, or other types of attachment members. The first propelling member 26 propels the body 16 through the air 12 while the body 16 is in flight. The first propelling member 26 is a propeller. The motor 30 drives the first propelling member 26. The wings 18 and the stabilizer 20 assist the body 16 in flying through the air 12. The navigation system 32, which may comprise a GPS unit or other type of navigation system known in the art, navigates the body 16 through the air 12. The control system 34, which may comprise a processor or other type of control system known in the art, controls the flight of the body 16 through the air 12. The communication system 36 allows the vehicle 10 to communicate date to other vehicles, communication systems, or command centers which may be located anywhere. The payload 38 may comprise a sensor, an instrument for environmental monitoring, or another type of payload depending on the purpose of the flight.

The vehicle 10 may be deployed in a zone 40 by a deploying member 42. The deploying member 42 may comprise an aircraft, or another type of deploying member. The vehicle 10 may fly a long distance to reach a zone 44. At the zone 44, the vehicle 10 may enter the water 14. Upon or before entry into the water 14 or within the water 14, e.g., a modified state including a. precursor to or post impact state may be deployed by, for example, the attachment members 22 detaching at least a portion of the wings 18, at least a portion of the stabilizer 20, and at least a portion of the first propelling member 26 from the body 16. Advantageously, in one or more exemplary embodiments illustrated below, the modified state, precursor to or post impact state, common assets and/or equipment, e.g., common motor, propellers, with the initial state are maintained so that reuse of vehicle components and sharing of vehicle components is maximized.

Furthermore, using principles illustrated in the exemplary embodiments below, commonality may be maintained to external interfaces, such as one or more platform interfaces including wired or wireless communications systems, including handling equipment, communications links, as well as sharing vehicle components, one or more pieces of equipment, and other assets including one or more cargo or cabin features. Additionally, using principles of the exemplary embodiments below, unmanned vehicle performance may be improved through disengagement, e.g., detachment, of one or more components to meet one or more mission requirements, such as Man-portable, light weight vehicle, heavy weight vehicle, and large class, whereas fixed configuration or redundant component systems, e.g., may be significantly limited when it comes to other mission requirements not specifically designed for.

In other embodiment, the type, location, and number of components detached from the body 16 upon entry into the water 14 may be varied. This reduces drag and makes the vehicle 10 more lightweight so that it can travel a longer distance. The vehicle 10 submerges within the water 14 to the submersion zone 46 due to the submersion-controlling device 24. The submersion-controlling device 24 may comprise a device which controls the depth 48 of the water 14 from the top 50 of the water 14 to which the vehicle 10 submerges to such as a buoyancy tank or other type of submersion-controlling device.

The second propelling member 28 propels the body 16 through the water 14 while the body 16 is underwater. The second propelling member 28 is a propeller. The motor 30 drives the second propelling member 26. This is the same common motor 30 which drove the first propelling member 24 while the body 16 was in flight in the air 12. The navigation system 32 navigates the body 16 as it moves through the water 14. This is the same common navigation system 32 which navigated the body 16 through the air 12 while the body 16 was in flight. The control system 34 controls the body 16 while the body 16 is moving through the water 14. This is the same control system 34 which controlled the body 16 while the body 16 was moving through the air 12 while the body 16 was in flight. The use of the common motor 30, the common navigation system 32, and the common control system 34 while the vehicle 10 is both in flight in the air 12 and while the vehicle 10 is in the water 14 reduces weight of the vehicle 10, allows for the vehicle 10 to be smaller, and allows for the vehicle 10 to travel farther distances. While the body 16 is underwater the vehicle 10 may perform various environmental monitoring functions or deploy the payload 38.

The vehicle 10 then remerges from the submersion zone 16 to the communication zone 52 the top 50 of the water 14 due to the submersion-controlling device 24. At the communication zone 52 the vehicle 10 may use the communication system 36 to communicate data to other vehicles, communication systems, or command centers which may be located anywhere. The data may relate to the purpose of the vehicle deployment or to other information the vehicle 10 measured using its systems or the payload 38. The vehicle 10 may also release or use the payload 38 at the communication zone 52 depending on the function of the vehicle 10. In other embodiments, the vehicle 10 may travel to different locations in varying orders and may be used to achieve varying functions.

Figure 2:
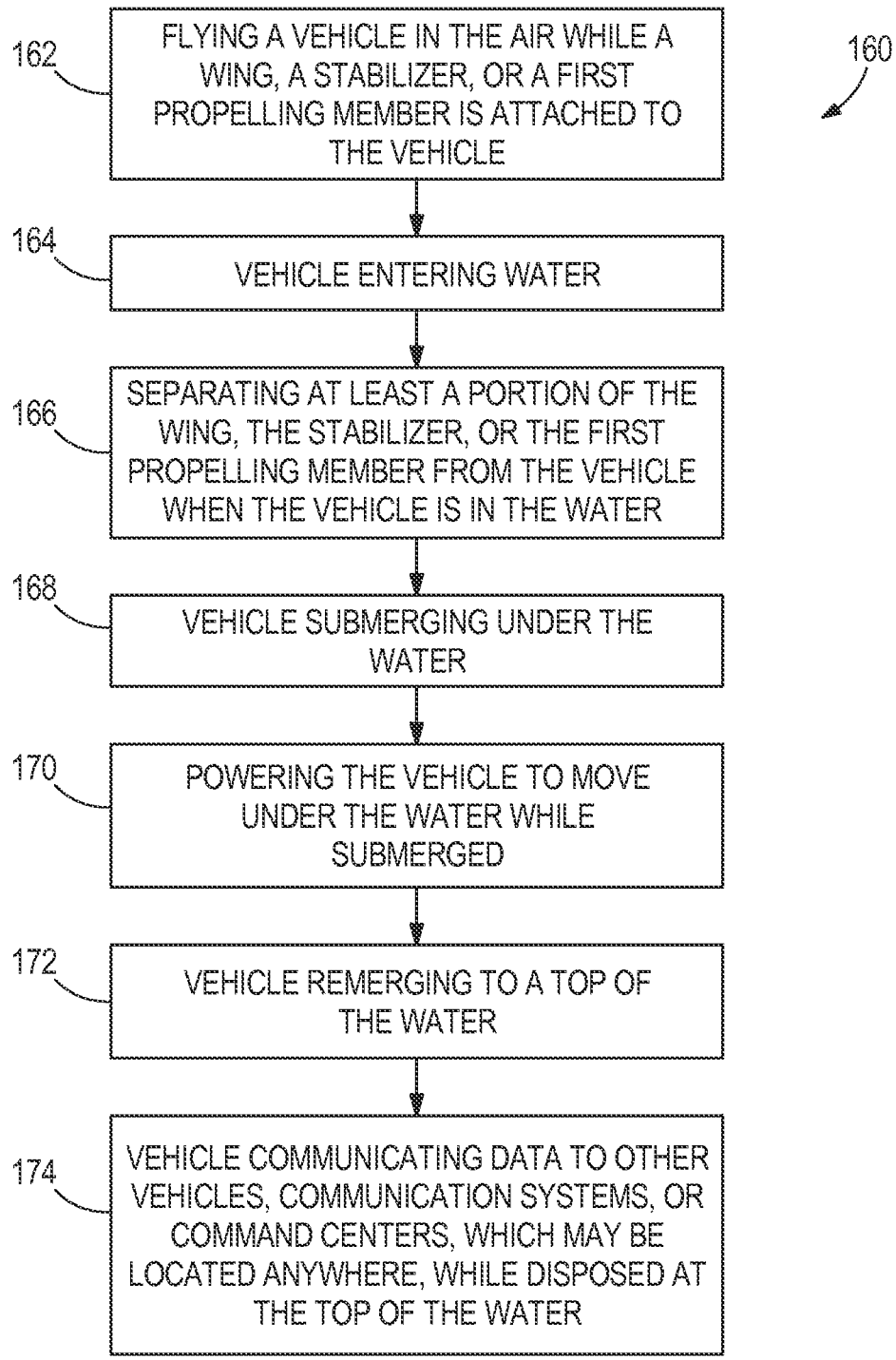
FIG. 2 is a flowchart illustrating one embodiment of a method of deploying a vehicle.

FIG. 2 is a flowchart illustrating one embodiment of a method 160 of deploying a vehicle. In step 162, the vehicle is flow in air while a wing, stabilizer, or first propelling member is attached to the vehicle. In step 164, the vehicle enters water. In step 166, at least a portion of the suing, at least a portion of the stabilizer, or at least a portion of the first propelling member is separated from the vehicle when the vehicle is in the water. In other embodiments, components varying in type, location, and number may be detached from the vehicle upon entry into the water. In step 168, the vehicle submerges under the water. In step 170, the vehicle is powered to move under the water while submerged.

Steps 162 and 170 utilize the same common motor to both fly the vehicle in the air and to power the vehicle to move under the water. Additionally, in both of steps 162 and 170 the same common navigation system and control system may be utilized to navigate and control the vehicle while flying through the air and while moving under the water. In step 172, the vehicle remerges to a top of the water. Steps 168, 170, and 172 may further comprise the vehicle using or releasing a payload, or making environmental measurements. In step 174, the vehicle communicates data to other vehicles, communication systems, or command covers which may be located anywhere while disposed at the top of the water. The communicated data may relate to the gathered information, to the purpose of the vehicle deployment, or to other environmental information the vehicle measured (i.e. water temperature, etc.) using its systems or the payload.

In other embodiments, one or inure of the steps of the method 160 may not be followed, may be modified, or one or more additional steps may be added. In still other embodiments, the method 160 may be used or altered to achieve varying functions.

One or more embodiments of the disclosure may reduce one or more issues of one or more of the existing vehicles and methods of their deployment. For instance, one or more embodiments of the disclosure may allow for one or more of the following bet fits: separable systems have different configurations in a first mode of vehicle travel, e.g., an initial state, pre-impact state, which may include detachment apparatus such as explosive bolts or salt water soluble glue to maintain component attachment, as compared to a second mode of travel, e.g., modified state, precursor to post-imp state, or post-impact state, in which the configuration is changed through detachment through one or more detachment apparatuses. Other benefits of the separable systems having different configuration includes, for example, a decreased size and weight of the vehicle due to the use of common systems during both flight and water-travel; an increase in the payload weight which can be carried due to a decreased size and weight of the vehicle due to the use of common systems during both flight and water-travel; an increase in the payload weight which can be carried by the vehicle due to the decreased size and weight of the vehicle; an increase in the distance the vehicle can travel due to the decreased size and weight of the vehicle; an increase in the functions of the vehicle, including measuring environmental conditions; a decrease in manufacturing cost of the vehicle due to the use of common systems and the avoidance of having to manufacture separate vehicles for air flight and for water-travel; or one or more additional benefits.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims. Accordingly, the disclosure is not to be restricted except in light of the appended claims and their equivalents.

The invention claimed is:

1. A vehicle adaptable for both flight and water travel comprising:
   a body configured to fly through air and to move through water;
   a wing or a stabilizer attached to the body while in flight;
   a first set of propelling blades attached to the body while in flight,
   the first set of propelling blades configured to propel the body through air while the body is in flight;
   a second set of propelling blades, coaxial with the first set of propelling blades, the second set of propelling blades attached to the body when the body is in flight and when the body is in the water,
   the second set of propelling blades configured to propel the body through water while the body is in the water;
   and at least one attachment member attaching the first set of propelling blades to the body while the body is in flight, wherein the at least one attachment member detaches the first set of propelling blades from the body when the body is in the water.

2. The vehicle of claim 1 wherein the vehicle is an unmanned vehicle
   that has one or more equipment configurations that are separable from one another including a pre-impact state and a precursor to or a post impact state
   that eliminates component and asset redundancy and increases maximizes component and asset reuse.

3. The vehicle of claim 1 wherein the vehicle is an underwater vehicle
   which is configured to submerge the body under the water, to move the body under the water,
   and to remerge the body to a top of the water.

4. The vehicle of claim 3 further comprising a buoyancy tank which
   is configured to control the submersion of the body under the water
   and to control reemergence of the body to the top of the water.

5. The vehicle of claim 1 further comprising the wing or the stabilizer being attached to the body
   with the at least one attachment member while the body is in flight,
   wherein the at least one attachment member is configured to detach the wing or the stabilizer from the body when the body is in the water.

6. The vehicle of claim 1 wherein the at least one attachment member comprises an explosive bolt or a water soluble glue.

7. The vehicle of claim 1 further comprising:
   a motor which is configured to drive the first set of propelling blades while the body is in flight,
   and which is configured to drive the second set of propelling blades while the body is in the water.

8. The vehicle of claim 1 further comprising a common navigation system which is configured to navigate the body while the body is flying in the air and which is configured to navigate the body while the body is moving through the water.

9. The vehicle of claim 1 further comprising a common control system which is configured to control the body while the body is flying in the air and to control the body while the body is moving through the water.

10. A vehicle adaptable for both flight and water travel comprising:
   a body configured to fly through air and to move through water
   a wing or stabilizer coupled to the body in flight;
   a first set of propelling blades coupled to a back end of the body while in flight,
   the first set of propelling blades configured to propel the body in flight;
   a second set of propelling blades, coaxial with the first set of propelling blades,
   the second set of propelling blades coupled to the back end of the body while in flight and while in the water,
   the second set of propelling blades configured to propel the body through the water;
   and a motor which is configured to drive the first set of propelling blades while the body is in flight, and which is configured to drive the second set of propelling blades while the body is in the water;
   wherein the first set of propelling blades is configured to automatically separate from the body when the body is in the water.

11. The vehicle of claim 10 wherein the vehicle is an unmanned vehicle which is configured to submerge under the water, to move under the water, and to remerge to a top of the water, the unmanned vehicle comprising one or more equipment configurations that are separable from one another including a pre-impact state and of a precursor to or a post impact state that eliminates component and asset redundancy and increases component and asset reuse.

12. The vehicle of claim 10 wherein the stabilizer is configured to automatically separate from the body when the body is in the water.

13. The vehicle of claim 10 further comprising a common navigation system which is configured to navigate the body while the body is flying in the air and which is configured to navigate the body while the body is moving through the water, and a common control system which is configured to control the body while the body is flying in the air and to control the body while the body is moving through the water.

14. A method of deploying a vehicle comprising:
flying a vehicle while a first set of propelling blades is attached to the vehicle with the first set of propelling blades propelling the vehicle through air;
entering water with the vehicle;
automatically separating the first set of propelling blades from the vehicle when the vehicle is in the water;
and powering the vehicle to move through the water with a second set of propelling blades which are coaxial with the first set of propelling blades.

15. The method of claim 14 further comprising submerging the vehicle under the water and powering the vehicle to move through the water while submerged.

16. The method of claim 14 further comprising using a common motor for both of the flying the vehicle and the powering the vehicle to move through the water.

17. The method of claim 14 further comprising navigating the vehicle while in flight and navigating the vehicle while moving through the water using a common navigation system.

18. The method of claim 14 further comprising controlling the vehicle while in flight and controlling the vehicle while moving through the water using a common control system.

19. The method of claim 14 further comprising flying the vehicle while a wing or stabilizer is attached to the vehicle, and automatically separating the wing or the stabilizer from the vehicle when the vehicle is in the water.

* * * * *

UNITED STATES PATENT AND TRADEMARK OFFICE
CERTIFICATE OF CORRECTION

PATENT NO. : 9,010,678 B1
APPLICATION NO. : 13/786299
DATED : April 21, 2015
INVENTOR(S) : Nathan Hiller It is certified that error appears in the above-identified patent and that said Letters Patent is hereby corrected as shown below:

In the Specification

Column 1, Line 29, please delete "IAN" and insert -- UUV -- therefor;

Column 2, Line 8, please delete "wring" and insert -- wing -- therefor;

Column 4, Line 14, please delete "16" and insert -- 46 -- therefor.

Signed and Sealed this
Twenty-ninth Day of September, 2015

Michelle K. Lee
*Director of the United States Patent and Trademark Office*